Sept. 22, 1936.   H. HILL ET AL   2,055,129
CLIPPERS FOR SUPERFLUOUS HAIR
Original Filed Sept. 4, 1934
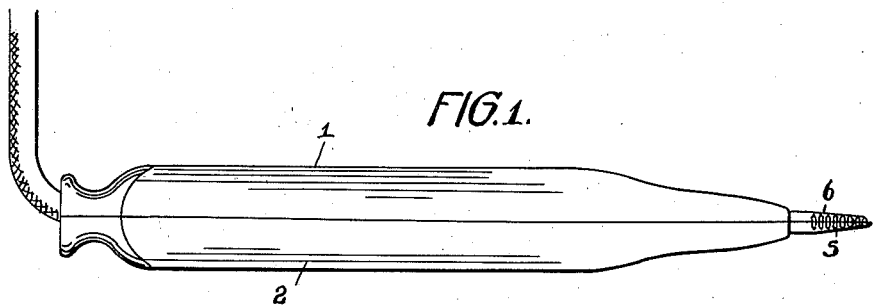
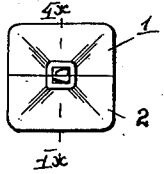
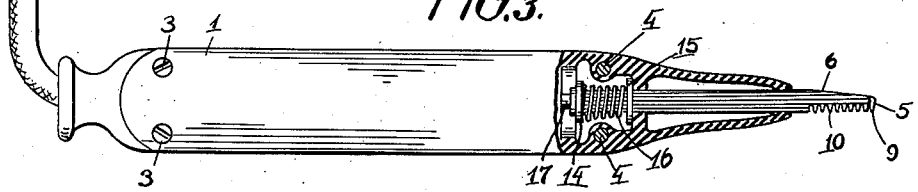
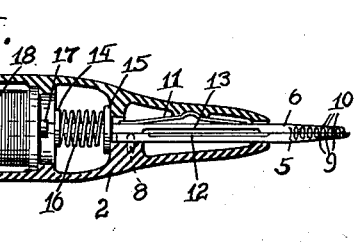
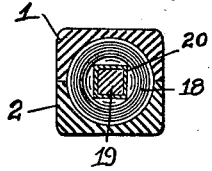
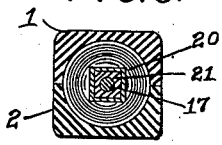
INVENTORS
HERMANN HILL &
WILLIAM H. FOXALL
BY
ATTORNEY Patented Sept. 22, 1936

2,055,129

UNITED STATES PATENT OFFICE 2,055,129

CLIPPERS FOR SUPERFLUOUS HAIR

Hermann Hill and William H. Foxall, Brighton, N. Y.

Application September 4, 1934, Serial No. 742,536
Renewed December 11, 1935

6 Claims. (Cl. 30—1)

This invention relates to electrically operated close cutting hair clippers and has for its object to provide a novel form and construction for such clippers to make them especially adapted for use in cutting the superfluous hair in the nose, ear or other parts of the body.

A further object of this invention is to provide an extremely simple and efficient mechanism for such clippers.

Another object of this invention is to provide the clippers with a novel handle with which it can be efficiently manipulated.

All these and other objects of this invention will become more readily apparent from the detailed description thereof which follows, reference being had to the accompanying drawing in which Figure 1 is a side elevation of the clippers.

Figure 2 is a front elevation of the clippers.

Figure 3 is a top plan view of the clippers with a portion of it illustrated in section.

Figure 4 is a longitudinal sectional view of the clippers, the section being taken on the line $4x$—$4x$ of Figure 2.

Figure 5 is a cross section of the clippers taken on the line $5x$—$5x$ of Figure 4.

Figure 6 is a cross section of the clippers taken on the line $6x$—$6x$ of Figure 4.

In the several figures of the drawing like reference numerals indicate like parts.

As illustrated in the drawing the clippers comprise an elongated hollow handle which is divided longitudinally into an upper casing 1 and a lower casing 2. These two casings are suitably clamped together by means of the clamping screws 3, 3 and 4, 4 near the front and rear thereof and are shaped to provide a handle having a substantially square cross section thruout its handle portion. The forward end of the casing is tapered and in it are mounted the stationary cutting blade 5 and the movable cutting blade 6. The stationary cutting blade 5 is anchored to the lower casing 2 by means of the pin 8 and projects from the tapered end of the handle with the cutting teeth 9 provided in the side at the outer end thereof. Coacting with the stationary cutting teeth 9 are the cutting teeth 10 provided in the side of the movable cutting blade 6 which is yieldingly held to move on the stationary cutting blade 5 by means of the spring 11. Both of the cutting blades are cut away at 12 and 13 respectively intermediate the ends thereof so as to reduce the frictional contact between them to a minimum.

The shank of the movable cutting blade 6 near the inner end thereof carries the washer 14 and between this washer and the washer 15 is located the expansion spring 16 so as to yieldingly force the end of the shank of the movable cutter against the outer end of the brass push rod 17 to keep it in constant contact therewith. This push rod is operated by the solenoid 18 and is mounted in the end of the movable armature 19 thereof. The solenoid has a central guide sleeve 20 and in the forward end of this sleeve is mounted the stationary core 21 which is hollow to provide a longitudinal bearing for the push rod 17. The movable armature or core 19 is spaced from the end of the stationary core 21 by the tapered air gap 22 and is adapted to slide back and forth in the rear portion of the guide sleeve 20. The movable armature 19 carries on the outside of the solenoid 18 a washer 23 which is adapted to move back and forth between the fixed washers 24 and 25 in the end of the handle to limit the reciprocating movement of the armature. The washers 24 and 25 are preferably made of cork or other suitable resilient and sound absorbing material which will deaden the impact between the washers and make the operation of the armature silent.

The spring 16 normally forces the push rod 17 to hold the movable armature 19 in its extreme left position in Figure 4. When the solenoid is excited by an alternating current the armature is energized and drawn into the solenoid during each half cycle of the alternating current, deenergized at the end of the half cycle and returned to its starting position by the action of the spring 16. In this way the armature is reciprocated 120 times a second by a 60 cycle alternating current. This rapid reciprocating movement is imparted to the movable cutting blade 6 which cooperates with the stationary cutting blade to clip any hair which is brought between the cutting teeth by moving the combined cutting blades over the surface of the skin.

As illustrated in the figures of the drawing, the cutting blades are narrow and project from a tapered end of the handle made up of the casings 1 and 2 so that the blades can be readily inserted into the openings of the nose and ear and moved around the inner walls thereof to cut the superfluous hair growing therein. The handle is provided with a square cross section so that the holder of the clippers can grip it with the cutter blades in a predetermined cutting position and keep it in this position during the cutting operation.

As illustrated in Figure 2 the teeth of the stationary cutting blade overhang the teeth of the moving cutting blade so as to provide a guard for the moving teeth and prevent the moving teeth from cutting the skin.

From the foregoing it will be apparent that because of the absence of any mechanical connection between the moving cutting blade and the push rod these two members need not be in perfect alignment with each other in order to have the push rod operate the movable cutting blade without binding.

We claim:

1. In a clipping device of the kind described the combination of a handle, a fixed and a movable shank, a cutting blade projecting from the end of each of said shanks with coacting cutting teeth on one side thereof, a solenoid within said handle, an armature movable in said solenoid and mounted to reciprocate in a straight line movement substantially in line with said movable shank, spring means acting on said movable shank to hold said movable shank in contact with the end of said armature at one end of said solenoid, a bearing provided in the end of said handle surrounding said shanks and spring means in said bearing for holding said movable shank in sliding contact with said fixed shank to provide a bearing surface between them.

2. In a clipping device, the combination as set forth in claim 1 including stop means cooperating with said armature at the other end of said solenoid for limiting the movement of said armature.

3. In a clipping device of the kind described the combination of a handle, a fixed and movable shank, a cutting blade projecting from the end of each of said shanks with coacting teeth on one side thereof, a solenoid within said handle, a fixed and a movable armature in said solenoid in line with each other, a nonmagnetic push rod carried by said movable core and slidably mounted in said fixed core, spring means for holding said movable shank in engagement with said push rod, a bearing provided in the end of said handle surrounding said shanks and spring means within said bearing for holding said movable shank in sliding contact with said fixed shank to provide a bearing surface between them.

4. In a clipping device of the kind described the combination of a handle, a fixed and a movable cutting blade projecting from the end of said handle with coacting teeth on one side thereof, a solenoid within said handle, a fixed and a movable armature in said solenoid in line with each other, a non-magnetic push rod carried by said movable armature and slidably mounted in said fixed armature, spring means for holding said movable cutting blade in engagement with said push rod, a washer carried on the outer end of said movable armature and a fixed resilient member located on opposite sides of said washer and spaced from it to limit the movement of said armature and deaden the sound of the impact of said washer.

5. In a clipping device of the kind described having a handle, a bearing provided in the end of said handle, a fixed and a movable shank mounted in said bearing, fixed spring means in said bearing and yieldingly resting on said movable shank to have said movable shank move between said spring means and said fixed shank, a cutting blade forming an extension of each of said shanks and held in frictional contact with each other by said spring means within said bearing and means for reciprocating said movable shank.

6. A clipping device as set forth in claim 5 in which the bearing surface of one of said shanks is cut away to reduce the frictional contact between said shanks.

WILLIAM H. FOXALL.
HERMANN HILL.